(12) United States Patent
Iwai et al.

(10) Patent No.: US 6,509,430 B1
(45) Date of Patent: Jan. 21, 2003

(54) COATING AGENT COMPOSITION AND COMPOSITE FILM

(75) Inventors: Makoto Iwai, Chiba (JP); Hiroyoshi Naito, Chiba (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 08/938,133

(22) Filed: Sep. 26, 1997

(30) Foreign Application Priority Data

Sep. 30, 1996 (JP) .............................................. 8-280384

(51) Int. Cl.$^7$ .............................................. C08F 230/08
(52) U.S. Cl. ........................................ 526/279; 428/447
(58) Field of Search ........................... 526/279; 428/447

(56) References Cited

U.S. PATENT DOCUMENTS 4,803,126 A    2/1989  Wyman ...................... 428/447
5,128,391 A *  7/1992  Shustack ...................... 522/92
5,215,822 A    6/1993  Wyman et al. .............. 428/447

FOREIGN PATENT DOCUMENTS

| EP | 0 624 464 A1 | 11/1994 | ........... B32B/27/08 |
| JP | 5-73774 | 3/1993 | ............ G08B/5/00 |
| JP | 6329821 A | 1/1994 | |
| JP | 6-329821 | 11/1994 | ............... C08J/7/04 |
| JP | 7-18221 | 1/1995 | ......... C09D/183/08 |
| JP | 7018221 A | 1/1995 | |

* cited by examiner

*Primary Examiner*—Edward J. Cain
(74) *Attorney, Agent, or Firm*—Alan R. Jarnholm; Robert L. McKellar; Jim L. De Cesare

(57) ABSTRACT

The present invention is a radiation-curable coating composition which comprises (A) a specified amino-group-containing alkoxysilane such as N-β-(N-vinylbenzylaminoethyl)-γ-aminopropyltrimethoxysilane, and (B) an acrylic polymer.

2 Claims, No Drawings

COATING AGENT COMPOSITION AND COMPOSITE FILM

The present invention concerns a coating agent composition which has a rapid curing rate, and which can form a cured coating film that is superior in terms of water resistance, anti-static properties and gas barrier properties following curing, and a composite film which is formed by laminating a cured film of said coating agent composition.

It is known that composite films having superior gas barrier properties are obtained by coating an organic resin film with a composition consisting chiefly of an organosilane. Examples of such compositions include compositions consisting of tetramethyl orthosilicate, an alkoxysilane such as a vinyltrialkoxysilane and a polyvinyl alcohol (see Japanese Patent Application Kokai No.6-329821), and mixtures which consist of an amino-group-containingalkoxysilane and a compound which contains aromatic rings such as xylylene diisocyanate (see Japanese Patent Application Kokai No. 7-18221). Furthermore, a method is also known in which a packaging material with superior gas barrier properties is obtained by coating an organic resin film with vinylbenzyl(2-aminoethyl)-3-aminopropyltrimethoxysilane and curing this coating film by irradiation with high-energy radiation (see Japanese Patent Application Kokoku No. 5-73774). However, the compositions used in these methods all suffer from the drawback of a slow curing rate. Furthermore, the cured films obtained following curing have inferior water resistance, and show a drop in performance under conditions of high humidity.

It is an object of the present invention to provide a coating agent composition which has a rapid curing rate, and which can form a cured coating film that is superior in terms of water resistance, anti-static properties and gas barrier properties following curing, and a composite film which is formed by laminating a cured coating film of said coating agent composition.

The present invention provides a high-energy radiation curable coating agent composition which comprises (A) an amino-group-containingalkoxysilane, such as N-β-(N-vinylbenzylaminoethyl)-γ-aminopropyltrimethoxysilane, which can be expressed by the general formula

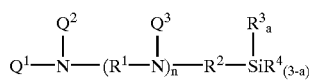

wherein $R^1$ and $R^2$ are divalent hydrocarbon groups with 12 or fewer carbon atoms, $R^3$ is an alkyl group with 6 or fewer carbon atoms, a cycloalkyl group or a phenyl group, and $R^4$ is a hydrolyzable group selected from a set consisting of alkoxy groups and aryloxy groups, $Q^1$, $Q^2$ and $Q^3$ are selected from the group consisting of hydrogen atoms and groups which can be expressed by the general formula X—$C_6H_4$—$CH_2$— wherein X is a vinyl group or a hydrogen atom, with the proviso that at least one of said $Q^1$, $Q^2$ and $Q^3$ groups are a group expressed by the general formula X—$C_6H_4$—$CH_2$—, n is 0, 1 or 2, and a is 0, 1 or 2, or a hydrochloride of the same, and (B) an organic compound which can be expressed by the general formula

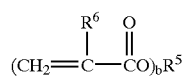

wherein $R^5$ is a residue of an organic polyhydric alcohol containing alcoholic hydroxyl groups bonded to different carbon atoms, or a residue of an ester formed by such an organic polyhydric alcohol and a polybasic acid, $R^6$ is a hydrogen atom or a methyl group, and b is an integer from 2 to 6. Also in accordance with the present invention, a composite film is formed by laminating a cured coating film of the above-mentioned coating agent composition on at least one side of an organic resin film.

In the above general formula which describes (A), $R^1$ indicates a divalent hydrocarbon group which has 12 or fewer carbon atoms, e.g., an alkylene group such as a methylene group, ethylene group or propylene group, etc.; in particular, an ethylene group is especially desirable. $R^2$ indicates a divalent hydrocarbon group which has 12 or fewer carbon atoms, e.g., an alkylene group such as a methylene group, ethylene group or propylene group, etc., or an arylene group such as a phenylene group or tolylene group, etc.; in particular, a propylene group is especially desirable. $R^3$ indicates an alkyl group with 6 or fewer carbon atoms, a cycloalkyl group or a phenyl group; in particular, a methyl group is especially desirable. $R^4$ indicates a hydrolyzable group selected from a set consisting of alkoxy groups and aryloxy groups, e.g., methoxy groups, ethoxy groups and phenoxy groups; in particular, a methoxy group is especially desirable. $Q^1$, $Q^2$ and $Q^3$ indicate groups which can be expressed by the general formula X—$C_6H_4$—$CH_2$— (in the preceding formula, X indicates a vinyl group or a hydrogen atom, with a vinyl group being especially desirable) or hydrogen atoms, with at least one of said groups being a group expressed by the general formula X—$C_6H_4$—$CH_2$— (in the preceding formula, X is the same as described above), n is 0, 1 or 2, and is preferably 1, a is 0,1 or 2, and is preferably 0.

Concrete examples of component (A) include N-β-(N-vinylbenzyl-N-benzyl)aminoethyl-γ-aminopropyltrimethoxysilane or a hydrochloride of the same, N-β-N-vinylbenzylaminoethyl)-N-benzyl-γ-aminopropyltrimethoxysilane or a hydrochloride of the same, N-β-(N-vinylbenzyl-N-benzyl)aminoethyl-N-benzyl-γ-aminopropyltrimethoxysilane or a hydrochloride of the same, N-vinylbenzyl-N-benzyl-γ-aminopropyltrimethoxysilane or a hydrochloride of the same, N-β-N-vinylbenzyl-N-benzyl)aminoethyl-N-benzyl-γ-aminopropyltriethoxysilane or a hydrochloride of the same, N-β-(Nvinylbenzyl-N-benzyl)aminoethyl-N-benzyl-γ-aminopropylmethyl-dimethoxysilane or a hycholride of the same, N-β-(N-vinylbenzyl-N-benzyl-γ-aminopropylmethyl-dimethoxysilane or a hydrochloride of the same, N-β-(N-vinylbenzyl-N-benzyl)aminoethyl-N-benzyl-γ-aminopropylmethoxydimethylsilane or a hydrochloride of the same, N-β-(N-vinylbenzyl-N-benzyl)aminoethyl-N-benzyl-γ-aminobutyltrimethoxysilane or a hydrochloride of the same, N-β-(N-vinylbenzyl-N-benzyl)aminoethyl-N-benzyl-γ-aminopentyltrimethoxysilane or a hydrochloride of the same, and N-β-(N-vinylbenzyl-N-benzyl)aminoethyl-N-benzyl-γ-aminohexyl-trimethoxysilane or a hydrochloride of the same, etc. In cases where a high-viscosity compound is used, the compound may be diluted with a solvent prior to use. Examples of solvents which can be used include methanol, ethanol, 1-propanol, 2-propanol, toluene, xylene, hexane, 1,1,1-trichloroethane,n-butanol and dioxane, etc.

In the above general formula which describes (B), $R^5$ indicates a residue of an organic polyhydric alcohol containing alcoholic hydroxyl groups bonded to different carbon atoms, or a residue of an ester formed by such an organic polyhydric alcohol and a polybasic acid. Examples of such polyhydric alcohols include ethylene glycol, polyethylene glycols with a degree of polymerization of 2 to 30, propylene glycol, polypropylene glycols with a degree of polymerization of 2 to 30, 2,2,4-trimethyl-1,3-pentanediol,1,4-cyclohexanedimethanol,2,2-bis[4-(2-hydroxyethoxy)phenyl]propane,2,2-bis[4-(2-hydroxypropoxy)phenyl] propane,2,2-bis(4-hydroxyphenyl)propane,2,2-bis(4-hydroxycyclo-hexyl)propane,1,6-hexanediol, 1,5-pentadiol [sic], 2-ethyl-1,3-hexanediol, glycerol, trimethylolpropane and 1,2,6-hexanetriol, etc. Furthermore, examples of the above-mentioned poly basic acids include phthalic acid, tetrahydrophthalic acid, hexahydrophthalic acid, terephthalic acid, adipic acid, sebacic acid, maleic acid and fumaric acid, etc. Concrete examples of such organic compounds include diethylene glycol diacrylate, tetraethylene glycol diacrylate, trimethylolpropanetriacrylate, pentaerythritol tetraacrylate and trimethylolpropanetrimethacrylate, etc.

It is desirable that the amount of component (B) that is used in the composition of the invention, be 1 to 10,000 parts by weight (preferably 50 to 2,000 parts by weight) per 100 parts by weight of component (A). In cases where the amount of component (B) that is added exceeds 10,000 parts by weight, there is a possibility that performance values of the cured product such as anti-static properties and gas barrier properties, etc., will be lost. On the other hand, if the amount added is less than 1 part by weight, curing is retarded so that the composition lacks practicality.

The coating agent composition of the present invention can easily be manufactured by uniformly mixing the above-mentioned component (A) and component (B). If necessary, various types of additives, the use of which in coating agent compositions is universally known, may generally be added to the coating agent composition of the present invention in addition to the above-mentioned components, as long as the addition of such additives does not interfere with the object of the present invention. Examples of such additives include silane coupling agents, pigments, antioxidants, agents which improve adhesion to the substrate, and agents which prevent thermal polymerization, etc. Examples of silane coupling agents which can be used include γ-aminopropyltrimethoxysilane, γ-aminopropyltrimethoxysilane[sic], tetraethoxysilane, tetraisopropoxysilane, methyltrimethoxysilane, vinyltrimethoxysilane, γ-glycidoxypropyltrimethoxysilane, γ-glycidoxypropyltrimethoxysilane, γ-methacryloxypropyltrimethoxysilane, γ-chloropropyltrimethoxysilane and γ-mercaptopropyltrimethoxysilane, etc.

After being applied to various types of substrates, the coating agent composition of the present invention is cured by being irradiated with high-energy radiation such as ultraviolet light, X-rays or an electron beam, etc. The thickness of the cured coating film of the composition of the present invention can generally be set at approximately 1 micron to 1000 microns. Substrates which can be used include organic resin films such as polyethylene films, polypropylene films and polyethylene terephthalate films, etc., as well as metal and glass, etc. Among these materials, organic resin films are especially desirable.

Known methods may be used to apply the coating agent composition of the present invention to the substrate e.g., a method using a coater such as a knife coater or roll coater, etc., or a method using spraying or immersion, etc.

The coating agent composition of the present invention described above has a rapid curing rate, and forms a cured film which has superior water resistance, anti-static properties and gas barrier properties, etc., following curing. Furthermore, films formed by laminating a cured coating film of the composition of the invention on at least one side of an organic resin film are superior in terms of water resistance, anti-static properties and gas barrier properties, etc., and can therefore be used in applications in which such characteristics are required.

Below, the present invention is described in terms of practical examples of application. Furthermore, in the practical examples, curability, curing time and water resistance were evaluated as follows:

Curability, Curing Time

The coating composition was applied as a coating to the surface of an organic resin film, and was cured by irradiation with ultraviolet light for a prescribed period of time. Afterward, the surface of the cured coating film was rubbed five times with the fingers in order to ascertain whether sufficient curing had occurred. The time after which smudging no longer occurred in the cured coating film, and the cured coating film was no longer stripped from the surface of the organic resin film, was taken as the curing time.

Water Resistance

The coating composition was applied as a coating to the surface of an organic resin film, and was cured by irradiation with ultraviolet light. Afterward, the composite film (2 cm×5 cm) thus obtained was immersed in a 100-cc beaker containing 50 cc of ion exchange water, and was allowed to stand for a prescribed period of time. The composite film was then removed, and the surface of the composite film was wiped clean by being rubbed five times with a paper cloth. The evaluation results were expressed as follows:

O: No swelling or variation was seen in the cured coating film, and the cured coating film was not stripped from the organic resin film.

X: The cured coating film was stripped from the surface of the organic resin film.

EXAMPLE 1

10 parts by weight of N-β-(N-vinylbenzylaminoethyl)-γ-aminopropyltrimethoxysilane hydrochloride (40% methanol solution) (commercial name: SZ6032, manufactured by Dow Corning Toray Silicone K.K.) and 37 parts by weight of pentaerythritol tetraacrylate were mixed to produce a coating agent composition. This coating agent composition was applied to the surface of a polyethylene terephthalate film with a thickness of 100 microns by means of a bar coater, so that the thickness of the resulting coating film was 10 microns. After being dried, this coating film was cured by irradiation with an electron beam using an electron beam irradiation apparatus (CB250/30/180L manufactured by Iwasaki Denki K.K.) under the following conditions: 150 kV, 5 mA, 10 m/min (5 kGy). The curability of the coating agent composition obtained here was investigated. Next, the water resistance and volume resistivity of the composite film thus obtained were measured. The results obtained are shown in Table 1.

EXAMPLE 2

100 parts of N-β-(N-vinylbenzylaminoethyl)-γ-aminopropyltrimethoxysilanehydrochloride (40% methanol solution) (commercial name: SZ6032, manufactured by Toray Dow Corning Silicone K.K.) and 32 parts by weight of trimethylolpropaneacrylate were mixed to produce a coating agent composition. This coating agent composition was applied to the surface of a polyethylene terephthalate film with a thickness of 100 microns by means of a bar coater, so that the thickness of the resulting coating film was 10 microns. After being dried, this coating film was cured by irradiation with an electron beam using an electron beam irradiation apparatus (CB250/30/180L manufactured by Iwasaki Denki K.K.) under the following conditions: 150 kV, 5 mA, 10 m/min (5 kGy). The curability of the coating agent composition obtained here was investigated. Next, the water resistance and volume resistivity of the composite film thus obtained were measured. The results obtained are shown in Table 1.

Comparative Example 1

A coating agent composition (i. e., a coating agent composition consisting only of N-β-(N-vinylbenzylaminoethyl)-γ-aminopropyltrimethoxysilanehydrochloride(40% methanol solution)) was prepared in the same manner as in Practical Example 1, except that the 37 parts of pentaerythritol tetraacrylate used in Practical Example 1 was not added. The characteristics of this coating agent composition were measured as in Practical Example 1. The results obtained are shown in Table 1.

Comparative Example 2

A coating agent composition was prepared in the same manner as in Example 2, except that tetrahydrofurfurylacrylate was added instead of the trimethylolpropaneacrylate added in Example 2. The characteristics of this coating agent composition were measured as in Practical Example 1. The results obtained are shown in Table 1.

Comparative Example 3

A coating agent composition was prepared in the same manner as in Practical Example 1, except that N-β-(aminoethyl)-γ-aminopropyltrimethoxysilane was added instead of the 37 parts of pentaerythritoltetraacrylate added in Practical Example 1. The characteristics of this coating agent composition were measured as in Practical Example 1. The results obtained are shown in Table 1.

TABLE 1

| | Practical Examples | | Comparative Examples | | |
|---|---|---|---|---|---|
| | 1 | 2 | 1 | 2 | 3 |
| Curing Time | less than 1 sec | less than 1 sec | 30 min | more than 60 min | 60 min |
| Water Resistance Immersion Time | | | | | |
| 5 min | ○ | ○ | X | X | ○ |
| 30 min | ○ | ○ | | | ○ |
| 24 hours | ○ | ○ | | | X |
| Volume Resistivity (ohm · cm) | $10^{10}$ | $10^{10}$ | $10^{10}$ | — | — |

Thus it has been shown that the high-energy radiation curable coating agent composition of the present invention consists of the above-mentioned component (A) and component (B), and is characterized by the fact that said coating agent composition has a rapid curing rate, and is able to form cured coating films which have a superior water resistance, anti-static properties and gas barrier properties following curing. Furthermore, the composite film of the present invention is characterized by the fact that said film is superior in terms of water resistance, anti-static properties and gas barrier properties.

What we claim is:

1. A composite film formed by applying a coating agent to at least one side of an organic resin film and thereafter curing the coating agent, the coating agent being a high energy radiation curable coating agent composition which consists essentially of (A) an amino-group-containing alkoxysilane having the general formula:

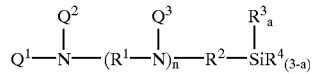

wherein $R^1$ and $R^2$ are divalent hydrocarbon groups having from 1–12 carbon atoms, $R^3$ is an alkyl group having from 1–6 carbon atoms, a cycloalkyl group, or a phenyl group, and $R^4$ is a hydrolyzable group selected from the group consisting essentially of alkoxy groups and aryloxy groups, $Q^1$, $Q^2$ and $Q^3$ are selected from te group consisting of (i) groups having the general formula $X-C_6H_4-CH_2-$, (ii) hydrogen atoms, and (iii) hydrochlorides of (i), wherein X is a vinyl group or a hydrogen atom, with the proviso that at least one of said groups is a group (i) and wherein n has a value of 0, 1 or 2, and a has a value of 0, 1 or 2, and, (B) an organic compound which has the general formula:

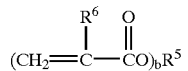

wherein $R^5$ is a residue of an organic polyhydric alcohol containing alcoholic hydroxyl groups bonded to different carbon atoms, or a residue of an ester formed by such an organic polyhydric alcohol and a polybasic acid, $R^6$ is a hydrogen atom or a methyl group, and b is an integer from 2–6.

2. The composite film of claim 1 wherein the organic resin is a polyethylene terephtalate film.

* * * * *